United States Patent [19]
Takashima

[11] Patent Number: 5,956,897
[45] Date of Patent: Sep. 28, 1999

[54] AUTOMATIC PLANT GROWING AND HARVESTING SYSTEM

[76] Inventor: Yasukazu Takashima, 20160 Spence Rd., Salinas, Calif. 93908

[21] Appl. No.: 09/113,245
[22] Filed: Jul. 10, 1998

Related U.S. Application Data
[60] Provisional application No. 60/052,281, Jul. 11, 1997.

[51] Int. Cl.$^6$ ................................................. A01G 31/00
[52] U.S. Cl. ........................... 47/60; 47/1.01 R; 47/62 R
[58] Field of Search .................................. 47/1.01 R, 17, 47/58.1, 60, 62.12

[56] References Cited

U.S. PATENT DOCUMENTS

| | | | |
|---|---|---|---|
| 3,673,733 | 7/1972 | Allen | 47/58.1 |
| 3,931,695 | 1/1976 | Widmayer . | |
| 4,077,158 | 3/1978 | England | 47/59 |
| 4,324,069 | 4/1982 | Flagg . | |
| 4,583,321 | 4/1986 | Stanhope | 47/58.1 |
| 4,813,176 | 3/1989 | Takayasu | 47/59 |
| 4,884,366 | 12/1989 | Morton . | |
| 4,887,388 | 12/1989 | Waltel, Jr. . | |
| 5,009,029 | 4/1991 | Wittlin . | |
| 5,136,804 | 8/1992 | Rothem et al. | 47/60 |
| 5,201,141 | 4/1993 | Ahm . | |
| 5,215,550 | 6/1993 | Tesch, Jr. et al. | 47/1.01 R |
| 5,228,229 | 7/1993 | Lindgren . | |
| 5,252,108 | 10/1993 | Banks | 47/58.1 |
| 5,295,325 | 3/1994 | Honda et al. | 47/1.01 R |
| 5,385,589 | 1/1995 | Kratky . | |
| 5,409,508 | 4/1995 | Erickson . | |
| 5,533,299 | 7/1996 | Kratky . | |
| 5,617,673 | 4/1997 | Takashima | 47/60 |
| 5,862,628 | 1/1999 | Takashima | 47/65.8 |

OTHER PUBLICATIONS

Newspaper (Chicago Tribune), unknown author, p. 10, Jan. 1959.

Primary Examiner—Michael J. Carone
Assistant Examiner—Jeffrey L. Gellner
Attorney, Agent, or Firm—Larry B. Guernsey; Michael J. Hughes

[57] ABSTRACT

An automatic plant growing and harvesting system 10 which can be used in either zero gravity or full Earth gravity conditions for controlled growth of plants 14, The system 10 includes an enclosure 12 which is adapted to allow at least one plant 14 to grow within, where the plants 14 each generally have a stem 56, foliage 52 and a root portion 58. The system 10 includes an illumination system 27, a material supply system 60 having a nutrient supply 72 and a water supply 70. The system 10 also includes a root chamber 50, a retractor assembly 46 for controllably retracting a lower portion of the plant stems 56 into the root chamber 50, a harvesting assembly 102 and a controller 100 which directs the actions of the included systems and assemblies. The system 10 is provided with a variable speed fan 26 to aid in produce harvesting and self-pollination, and a gravity compensator 114 for preventing water vapor accumulation in stagnant areas. A self-contained potable water system 91 is included which cooperates with the material supply system 60 as gray water is fed to the roots 58, and transpirated water vapor from the plants' foliage 52 is collected and condensed to produce potable water. The enclosures 12 may be grouped in collective structures 154, which may be illuminated by a collective light source 158.

23 Claims, 7 Drawing Sheets

AUTOMATIC PLANT GROWING AND HARVESTING SYSTEM

This application claims priority from U.S. Provisional Application No. 60/052,281 filed on Jul. 11, 1997.

TECHNICAL FIELD

The present invention relates generally to growing systems used in agriculture, and more particularly to self-contained growing systems for plants. The inventor anticipates that primary application of the present invention will be in future long-range space missions. Examples of such industries include space stations, or self-contained colonies. However, the present invention is also well suited to use in deserts, and tundras or anywhere in which natural environmental conditions may be inhospitable. Additionally, it may be used in otherwise hospitable environments in which cost reduction, isolation from disease, minimization of pollution and reduction of resource use are desirable.

BACKGROUND ART

As world populations increase, the importance of agriculture in production of food supplies becomes ever more apparent. In a world of finite resources, an expanding population demands efficiency in use of these resources. This occurs at a time when environmental concerns have also pointed out problems with conventional agricultural methods.

Many factors are involved in growing an economically successful agricultural crop, since a proper blend of nutrients and water must be provided, as well as protection from insect pests, disease, and harsh environmental conditions. As a result, the success of a crop in an exterior, uncontrolled environment involves a degree of risk, and demands reliance on unpredictable factors. In order to reduce these risks, conventional farmers have come to rely on chemical fertilizers, pesticides and treatments for plant diseases which can, in themselves, produce unwelcome or unknown effects. The use of pesticides in commercial agriculture has led to the killing of non-target species due to concentrations of poisons in water run-off.

Even when artificial chemicals are not used, variations in rainfall or temperature can lead to environmental problems. In certain drought-stricken areas, low aquifer pressure has lead to salt water intrusion, which can cause environmental damage, as well as endanger crop yields. All of these problems in conventional agriculture result from crop production in what is largely an uncontrolled environment.

Conventional methods can also be very labor and cost intensive. As an example, in conventional methods of growing tomatoes in a field, the soil must first be cultivated by using tractors to disk the field. Herbicides may be applied to kill off competing plant growth, and fertilizers may be added to provide nutrients. The plants are then transplanted in the field, and may require staking as they grow larger, and pesticides may be applied to discourage tomato horn-worms, and other pests. If local rainfall is inadequate, watering or irrigation must be used periodically. Regular attention is required as the plant continues to grow and the fruits are harvested. As the plants start to bear fruit from the lower part of the stem, it is common practice to fold the lower parts of the stem down to the ground to allow more growing space on top. As the older, lower portion of the stem becomes brittle, the older foliage becomes unproductive and is increasingly susceptible to disease. The production of fruit usually takes 70–90 days. Harvesting the crop and transporting the fruit to the packing shed require much labor. A large amount of water is used, a large portion of which is lost due to evaporation and soil seepage. Effluent, as well as exhaust from trucks used to carry workers and harvest, can pollute the environment. Energy resources in the form of fuel and energy for pumps, etc. are used up in the process.

This process points out many deficiencies in conventional agriculture. It would be a great improvement if the plants would start producing earlier and harvesting could be done continuously without the use of manual labor, where reliance on risky environmental factors is reduced, where water and resource requirements could be reduced, and use of chemical herbicides, pesticides and fertilizers reduced or eliminated.

One prior art attempt to create a more efficient system for growing plants is found in U.S. Pat. No. 3,931,695 to Widmayer. This patent shows a method and apparatus for growing plants using artificial lights which are pulsed on and off at a rate which does not allow the plants to become overheated. It also discloses a scheme by which plant roots are woven into a movable belt which pulls the plant roots down into a nutrient solution, as the plant grows upward. Widmayer's invention, however, presents a very bulky mechanism in which the nutrient tank is not enclosed and would not be useable in low gravity conditions. Additionally, this system appears not to be designed for complete conservation and reuse of water, and some water loss through evaporation can be expected under terrestrial conditions.

Thus, there is a great need for an automated plant growing and harvesting system which can be used either in low or zero gravity, or in terrestrial conditions in which growing conditions can be maximized, environmental factors can be precisely controlled, and resources maximally conserved.

DISCLOSURE OF INVENTION

The present invention is a plant growing and harvesting system. The present invention addresses many deficiencies in conventional agriculture by providing an enclosed and highly controlled environment in which plants can be isolated from disease and insect pests, thus requiring little or no chemical treatments. The water used can be largely recycled, is administered in precise quantities for optimum growth, and is isolated from the local water table, if any. Light and dark cycles can be scheduled for maximum growth and produce output. Tomatoes can produce fruit in as little as 30–45 days, and may continue to bear fruit all year perpetually without reduction in productivity until the crop is terminated. Additionally, since the process is largely automated, there is a great reduction in required labor and its associated costs.

Accordingly, it is an object of the present invention to provide an enclosed environment which can protect plants from insect attack and disease.

Another object of the invention is to provide a system for growing plants which minimizes energy consumption.

And, another object of the invention is to provide a system for growing plants in which the requirement for manual labor is minimized.

A further object of the present invention is to provide a plant growing system in which growth conditions can be optimized.

Yet another object of the present invention is to provide a system which maximizes produce yields from plants.

A yet further object of the present invention is to provide a plant growth system which minimizes growth time for plants.

Still another object of the present invention is to provide a plant growing system in which water use is minimized through recycling of water and water vapor.

Yet another object of the present invention is to provide a plant growing system which can be used in self-contained human environments, such as space stations, to precisely match plant requirements and products to optimally interact with human and animal populations. For example, the timing of plant and animal sleep cycles can be timed to coincide, by controlling the duration of growth light activation. This can match animal and human carbon dioxide production to plant's requirements, and likewise the plant's oxygen production can be precisely controlled.

An additional object of the present invention is to provide a system for plant growth in which the requirements of different plant species can be met by adjusting nutrient and light provision.

A yet further object of the present invention is to provide a system in which gray water can be converted to potable drinking water for human consumption.

Briefly, one preferred embodiment of the present invention is an automatic plant growing and harvesting system which can be used in either zero gravity or full Earth standard gravity conditions for controlled growth of plant matter. This system includes an enclosure which is adapted to allow a plant to grow within, an illumination subsystem for providing light for growth, and a material supply system for selectively providing nutrients and delivering growth fluids to the plants. The material supply system including a nutrient supply and a water supply. The plant growing and harvesting system also includes a root chamber for containing root portions of the plants, and a retractor assembly for controllably retracting the plants into the root chamber. A harvesting assembly is also provided for removing and delivering produce from the plant as it matures. A controller directs the actions of the illumination subsystem, the material supply system, the retractor assembly and the harvesting assembly.

Growth sensors may be provided which inform the controller of the rate of plant growth. The controller may then activate the retractor assembly to pull the plant stem downwards into the root chamber at substantially the same rate as the growth rate of the plants. The harvesting assembly may include a cutting blade assembly of knives which are used to trim the lowest branches from the plant's stem as it is pulled downwards by the retractor assembly, in order to harvest produce. A basin and harvesting tube are provided, and a variable speed fan may also be used to urge the plant produce into the harvesting tube and basin under conditions of low or zero gravity. A gravity compensator is also provided which can increase air flow pressure to sweep accumulated water condensation from areas which may otherwise be stagnant.

The enclosures are designed as modules, which may be operated independently or may be operated in groups of modules which may have a common lighting source. The modules may be arranged in tight conjunction with each other, and may be equipped with a pivot, so that access may be had to the enclosure interior.

A method is also provided for automatically growing and harvesting plant produce under conditions of zero gravity or full Earth standard gravity.

An advantage of the present invention is that the plant growth system is completely enclosed so that neither insects nor plant diseases can reach the plants.

Another advantage of the invention is the elimination of use of pesticides, fungicides and herbicides, thus causing less environmental pollution and less killing of non-target species.

And, another advantage of the invention is that only a precisely measured amount of energy is needed for plant growth, and the energy expenditures involved in tending, and harvesting the plants' produce are greatly reduced.

Another advantage of the present invention is that by optimizing growth conditions, plant development time can be greatly speeded, and produce yields can be greatly increased.

Still another advantage is that water vapor is not lost through evaporation and water is recycled, thus reducing costs for water, and allowing for agriculture in areas which are traditionally inhospitable to plant growth.

An additional advantage is that plants can produce year-round harvests, and plants can continue to bear indefinitely until the crop is terminated. Reseeding is reduced with accompanying reduction in costs.

Yet another advantage is that the plant growing system can be used in self-contained habitats such as space stations, or lunar colonies.

An additional advantage is that the plant growing system is completely isolated from the local water table, if any, and near complete control over environmental factors is allowed.

Another additional advantage is that manual labor and its attendant costs can be minimized.

A further advantage of the present invention is that sterilization of the system can be done to control disease.

Yet further advantages of the present invention are that no capital investment in heavy equipment is required, and land is used more efficiently.

A still further advantage of the present invention is that no multiple growing locations are required to obtain the ideal site for each crop, since only one stationary system is adequate for year-around production of many different types of crops. Individual modules can be adjusted to provide optimal conditions for a variety of crops having widely differing growth requirements.

Yet another advantage of the present invention is that gray water which may contain elements of human waste can be applied to the roots of the plants to provide nutrients. The foliage of the plant casts off water vapor through transpiration. This water vapor is contained in a separate system in which the transpirated vapor is collected and condensed to provide potable drinking water which is suitable for human consumption.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
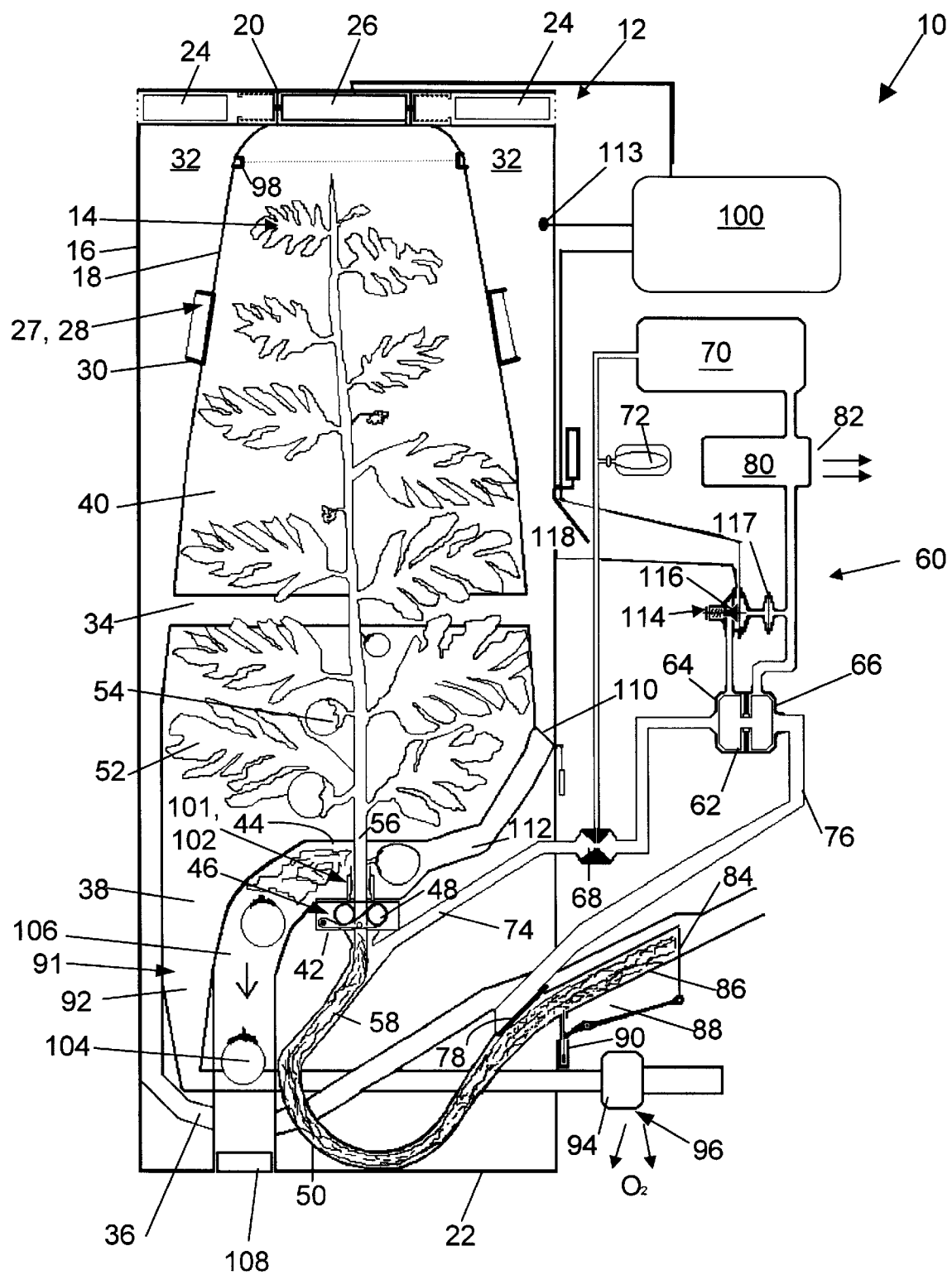
FIG. 1 is a side cut-away view of an automated plant growing and harvesting system.

A preferred embodiment of the present invention is an automated plant growing and harvesting system, which is suitable for growing both vining plants such as tomatoes, and non-vining plants such as lettuce. As illustrated in the various drawings herein, and particularly in the view of FIG. 1, a form of this preferred embodiment of the inventive device is depicted by the general reference character 10.

FIG. 1 illustrates a side cut-away view of one version of the plant growing system 10 which includes an enclosure 12 into which a plant 14, has been placed. The enclosure 12 includes a plurality of outer walls 16 and a plurality of inner walls 18, as well as a ceiling 20 and a floor 22. It should be understood that these terms are used merely as a matter of convenience, and especially in zero-gravity environments the "floor" may be oriented above the "ceiling" relative to an observer, or the entire system may be turned sideways so that they are both relatively "vertical". Therefore, for ease of reference, movement in the direction of the floor 22 shall be called "down" and movement in the direction of the ceiling 20 shall be referred to as "up", although these terms may lose their ordinary meanings when in space.

The ceiling 20 includes one or more air filters 24, and a variable speed fan 26 which can be used to force air in a downward direction and is useful for aiding pollen circulation for self-pollination. An illumination system 27 provides and delivers photosynthetic energy to the plants 14. This illumination system 27 may include interior lights which are placed within the enclosure 12, or may be a bank of lights exterior to the enclosure 12, perhaps which illuminate a number of enclosures at once. The illumination system 27 may also include fiber optic bundles or plastic rods (described below in reference to FIG. 5), which act to direct exterior light such as sunlight, into the enclosure. In the preferred embodiment shown in FIG. 1, the illumination system 27 includes one or more grow lights 28. These lights 28 have been attached to the upper portion of the inner walls 18, which are transparent near the lights, but may be inwardly reflective on the remainder of the walls 18. It is to be understood that many other configurations of light fixtures and positions are possible, such as direct overhead mounting, on the ceiling 20 etc. A water and heat shield 30 is provided for each light. The spaces between the outer walls 16 and the inner walls 18 form one or more air channels 32. It is expected that the heat from the lights 28 will warm the air in the air channels 32. In order to equalize pressure in the air channels 32, connecting ducts 34 are established between the air channels 32. Approaching the floor 22, one or more of the air channels 32 taper and form into a heat exhaust tube 36.

A support deck 38 and the inner walls 18 define a growing space 40. The support deck 38 includes a support assembly 42, and a harvesting basin 44. The support assembly 42 further includes a retractor assembly 46 having a plurality of pinch rollers 48 and a motor (not shown in this figure) for activating rotation of the pinch rollers 48. Below the support assembly 42 is a root chamber 50. The plant 14 having foliage 52, fruit 54, a stem 56 and a root section 58 is situated in the growing space 40 so that the stem 56 is captured between the pinch rollers 48 of the support assembly 42, and the root section 58 is enclosed within the root chamber 50. The foliage 52 are illuminated by the grow lights 28 which encourages growth of the plant 14.

A material supply assembly 60 includes a turbo-charger 62 which has a primary chamber 64 and a secondary chamber 66. The primary chamber 64 is connected to an atomizer 68, which is in turn connected to a water tank 70 and a nutrient tank 72. Air is expelled from the primary chamber 64 at high speed, creating a pressure drop at the atomizer 68 which causes water to be drawn from the water tank 70 and nutrients from the nutrient tank 72. These combine with the air stream to create a spray which is applied to the root section 58 in the root chamber 50 through a spray tube 74. The secondary chamber 66 of the turbo-charger 62 is attached to an intake tube 76 which joins to a portion of the root chamber 50, with a section of screen 78 to keep root material in the root chamber 50, while allowing air and water vapor to pass. This air-vapor mixture passes into the secondary chamber 66 of the turbo-charger 62 and then is expelled to a water separator 80 in which the water vapor is collected and returned to the water tank 70, while the air is released through air vents 82.

The heat exhaust tube 36 joins with the root chamber 50 to form a root desiccation chamber 84. A root trimmer blade 86 is mounted on a central pivot 88 near the end of the root chamber 50. A solenoid 90 is positioned to cause the blade 86 to slice through a portion of the root 58 that extends into the root desiccation chamber 84. The severed root portion then is dried by the hot air from the air channel 32 which has traveled down the exhaust tube 36 and into the root desiccation chamber 84.

The growing space 40 connects with a water vapor collector 92 which is also connected to a second water separator 94 from which $O_2$ is released through vents 96. The output of the separator can be connected to the main water tank 70, or can provide a source of potable water. This is especially advantageous because gray water, which may contain elements of human waste, can be applied to the roots 58 of the plants 14 to provide nutrients through the material supply assembly 60. The foliage 52 of the plant 14 casts off water vapor through transpiration. This water vapor is contained in a separate potable water system 91 including the water vapor collector 92, which has no contact with the contaminants in the gray water. Thus the growing system 10 acts as a kind of organic filter to provide potable drinking water output from gray water input. This has many advantages in terms of energy conservation and component reduction, which may be crucial for space station applications, lunar colonies or underwater installations.

One or more sensors 98 may be located near the ceiling 20 of the growing space 40 to detect when the plant 14 has reached a predetermined height. These sensors may be in the form of a beam which is interrupted when the plant 14 is tall enough, or some other mechanism. These sensors 98 send a signal to the master control 100. This master control 100 also has connections to the variable speed fan 26, the material supply system 60, the retractor assembly 46 and various other electrical and electro-mechanical assemblies in the plant growing system 10. For the sake of clarity in viewing the drawing, these connections have not been drawn in the figure.

When the master control 100 has been informed by the sensors 98 that the plant 14 has reached the optimum height, the control sends a signal to the retractor assembly 46 which causes the pinch rollers 48 to rotate so that the plant 14 is slowly pulled downwards into the root chamber 50 at the same rate at which the plant 14 grows upwards. A harvesting assembly 101 is provided which includes a branch trimming assembly 102, the harvesting basin 44 and a harvesting tube 106. The branch trimming assembly 102 is positioned around the stem 56 within the harvesting basin 44 and above the support assembly 42. As the stem 56 is pulled downwards, the foliage 52 with their fruit 54 are pulled onto the blade 102, which trims them from the stem 56 and into the harvesting basin 44. The harvested fruit 104 travels through a harvesting tube 106 that is connected to the harvesting basin 44, and the fruit can be removed from a door 108. In zero or very low gravity environments, forced air from the variable speed fan 26 can be used to urge the fruit 104 down the harvesting tube 106 by forcing air into the air channels 32. An air flap 110, which is normally closed to maintain pressure in the air channel 32, can be opened to allow forced air to flow down a channel 112 to urge the fruit and branches down the harvesting tube 106 to the door 108. The air flap 110 can also be opened to allow warm air to flow into the root chamber 50 to maintain the appropriate temperature for optimum growth.

In low gravity environments, condensed water vapor can collect in areas which normally drain due to the pull of gravity. A gravity compensator 114 which includes a valve 116 can be used with an isolator 117 to vary and regulate pressure in the air circuit which includes the turbo charger 62 and the root chamber 50. The gravity compensator receives air input from the air passage 118 and reduces water accumulation by providing pressurized air which forces water to travel to the water separator 80. The workings of this device are described in more detail below in FIG. 6.

Figure 2:
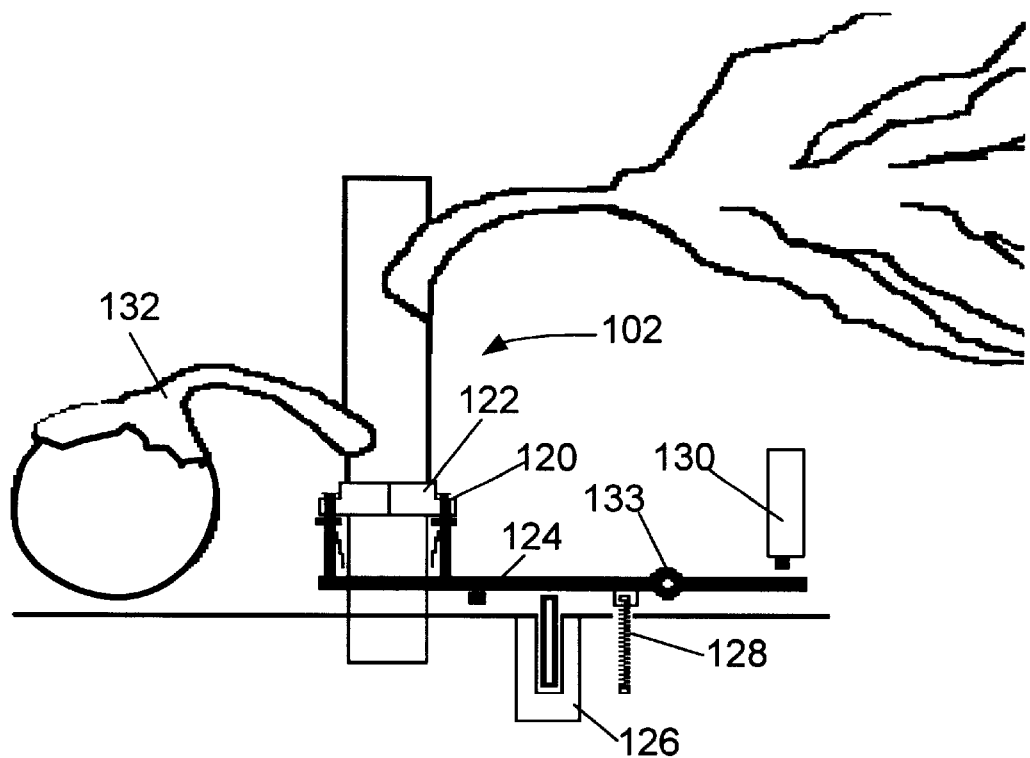
FIG. 2 is a detail view of the branch trimming assembly and plant stem of FIG. 1.

FIG. 2 illustrates a detail view of the branch trimming assembly 102 seen in FIG. 1. This includes a cutting blade subassembly 120 which further includes a cutting blade 122. The trimming assembly 102 also includes a swing arm 124, a solenoid 126, a spring 128 and a micro-switch 130. The downward movement of the plant 14 is very slow, since the retractor assembly 46 (see FIG. 1) will pull it down at roughly the same rate at which it grows upwards. If the cutting blade assembly 102 were to remain stationary as the stem 56 is dragged downwards, the cutting process could take days to accomplish. As an alternative, this version of the branch trimming assembly 102 operates to cut more quickly. The swing arm 124 is not normally in contact with the micro-switch 130. As the plant 14 is pulled down and a branch 132 presses on the blade 122, the swing arm 124 rotates about the pivot 133 until contact is made with the micro-switch 130. This sends a signal to the master control 100 which activates solenoid 126 to push the swing arm 124 and the attached cutting blade subassembly 120 upwards and the cutting blade 122 will act to sever the branch 132. A spring 128 is provided to keep the swing arm 124 from swinging too freely and contacting the micro-switch 130 too early. It is to be understood that many other variations of this mechanism may be utilized to produce this effect.

Figure 3:
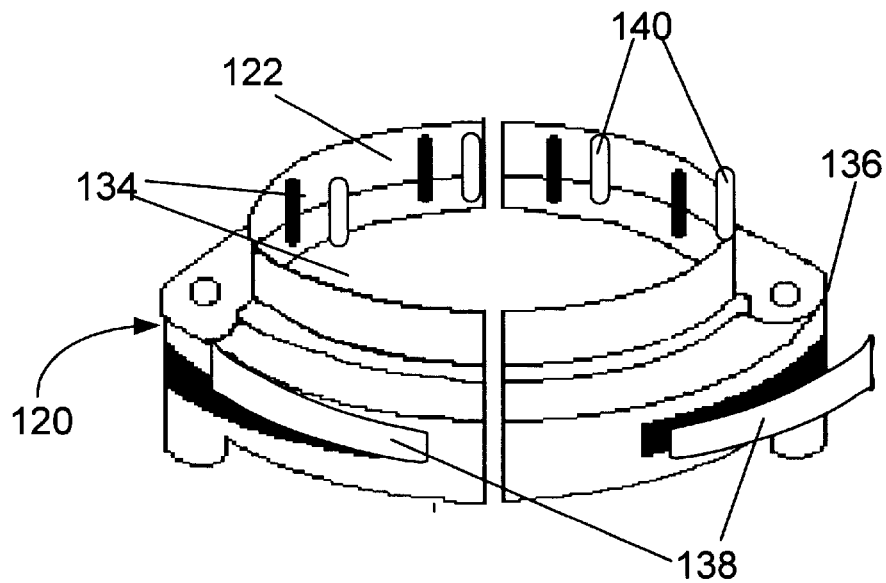
FIG. 3 is a detail of the cutting blade subassembly of FIG. 2.

FIG. 3 illustrates a detail view of the cutting blade subassembly 120 seen in FIG. 2. In this version of the preferred embodiment, the subassembly includes a cutting blade 122 which is in four sections 134, and pairs of these sections are joined with pivot pins 136. Leaf springs 138 are included around the perimeter of the sections, which act to press the sections 134 together to form a smaller diameter central circular opening. The interior circumference of the subassembly 120 further includes ribs 140 which act to guide the stem 56.

Figure 4:
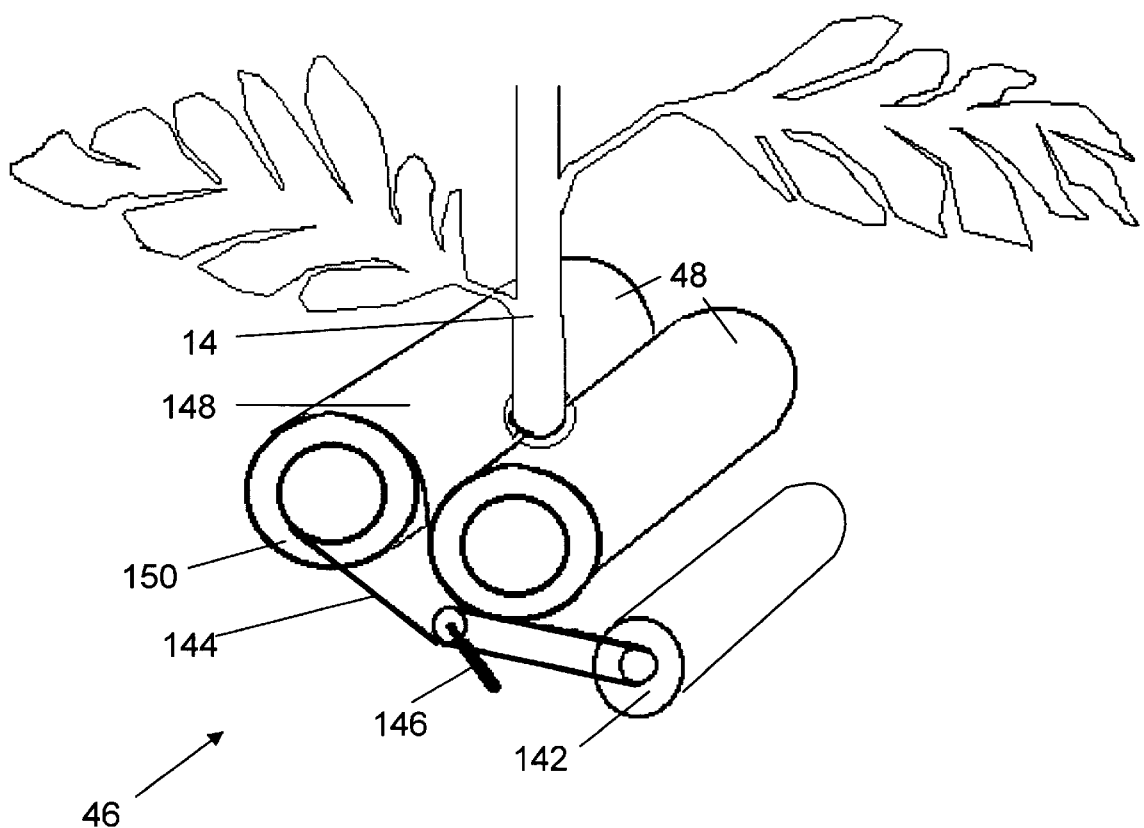
FIG. 4 is a detail view of the retractor assembly of FIG. 1.

FIG. 4 shows a detail view of the retractor assembly 46 seen in FIG. 1. A plant 14 is shown held between two pinch rollers 48. In this version of the preferred embodiment, a motor 142 is shown whose rotary motion is coupled to the rollers 48 by a belt 144. An idler 146 is provided, and the pinch rollers 48 may have an optional foam rubber covering 148 and may also have sprockets 150 for engaging the belt 144. It is to be understood that any number of other coupling mechanisms, such as a direct gear engagement, etc. could be used to couple the rotational motion to the pinch rollers 48.

Although the plants can be grown in larger enclosures which each contain a number of plants, there are certain advantages to having them grown in smaller modules, in which the plants are grown separately, or in small groups. Varieties of plants differ in their requirements concerning cycles of light and darkness in order to produce optimally. Lettuce, for example, can be exposed to light for 24 hours a day, and can continue to produce nutrition that is available for humans, without requiring a period of darkness, (also called a "sleep cycle"). Tomatoes, however, do require a period of darkness and lowered temperature in order to translocate photosynthetic products created in the foliage of the plant to the fruiting body. They therefore require a sleep cycle in order to provide nutritious food. By using smaller modules, the differing nature of the plant varieties can be more easily accommodated in the scheduling of light usage. Also, in an enclosed environment, like a space station, the relative amounts of oxygen produced by plants and carbon dioxide produced by humans must be kept in good balance. Both humans and plants tend to produce less of these gases when they are in their respective sleep cycles. By having the plants in smaller modules, and scheduling appropriate sleep cycles, the overall oxygen-carbon dioxide balance can be more flexibly maintained. For example, if crewmembers are retiring to sleep, an appropriate number of lights in the plant modules can be turned off to maintain the balance, and sleep cycles for the individual plants can be staggered as required.

Figure 5:
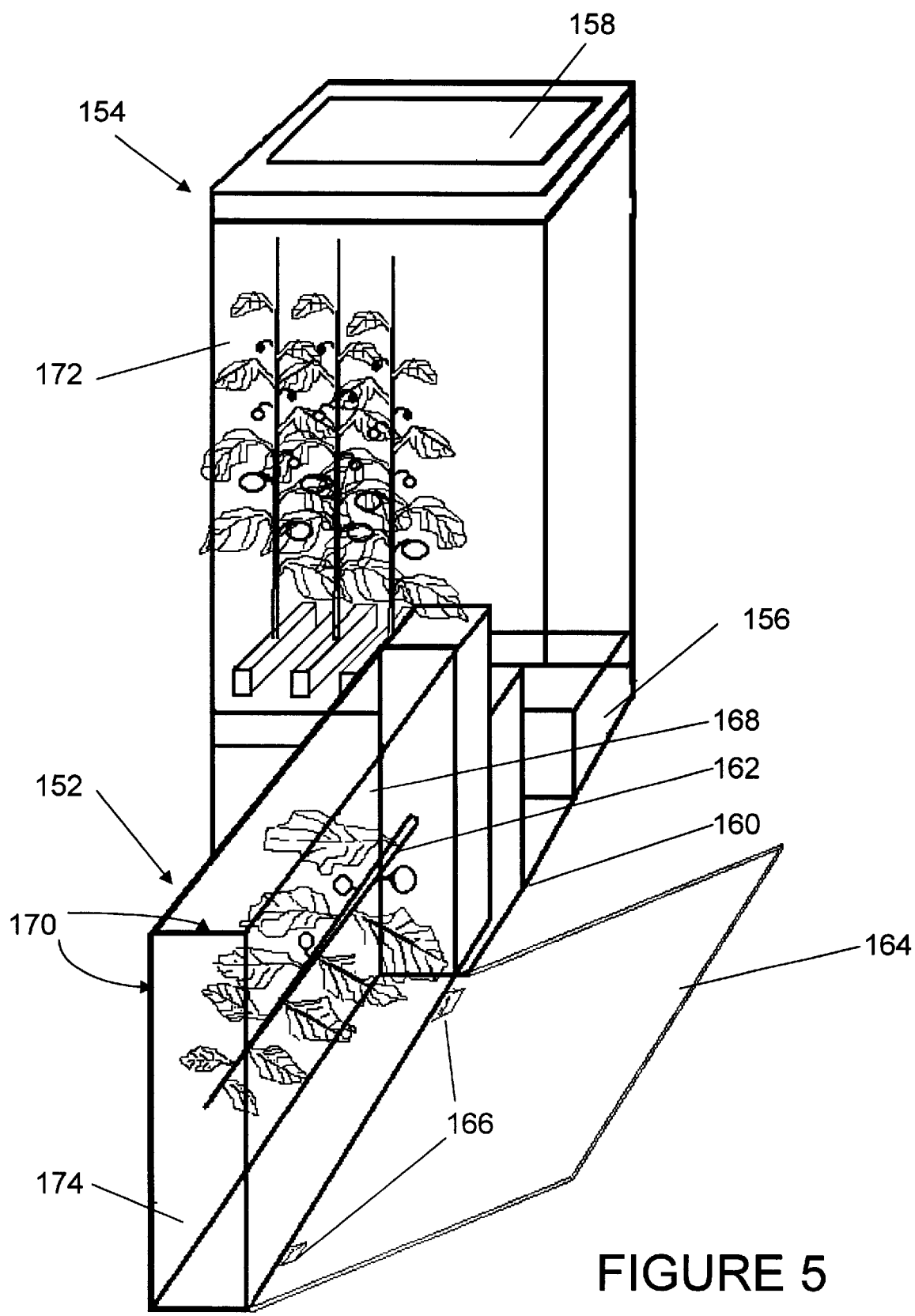
FIG. 5 is an isometric view of a collective structure including a group of plant growing modules.

FIG. 5 illustrates a number of plant growing modules 152 which have been grouped into a collective structure 154. The collective structure 154 can include a water tank 156 and a collective light source 158, although it is also possible for each module 152 to have its own light source. In this version of the preferred embodiment, each module 152 is attached to the collective structure 154 by a pivot 160 which allows each module to be turned in a horizontal orientation for easier access. Plants 14 inside the modules 152 can be pruned or directed to grow mainly in one lateral direction corresponding to the longer dimension of the module. Plastic rods 162 can be provided for plant support and training as well as aiding in distribution of light. These plastic rods 162 can be coupled with fiber optic cables to direct light to the plant foliage 52 if exterior illumination is used instead of, or in addition to, interior lights. A door 164, which includes hinges 166 and a latch 168, provides access to the interior. Three of the sides 170 of the module 152, including the inside of the door 164, may be reflective, and the fourth, front side 172 can be a two-way mirror which allows the attendant to observe plant growth, while still reflecting most of the light back onto the plant 14. In versions in which there is a collective light source 158 in the collective structure 154, the top wall 174 may be transparent.

Additionally, a shaker motor, not shown, may be used with either the larger multi-plant structures or in the smaller modules to help distribute pollen. By shaking the foliage, the stem or the base plate, pollen is caused to float in the air within the enclosures and thus cause self-pollination. Alternatively, an overhead variable speed fan can be used for this purpose, as discussed above.

Figure 6:
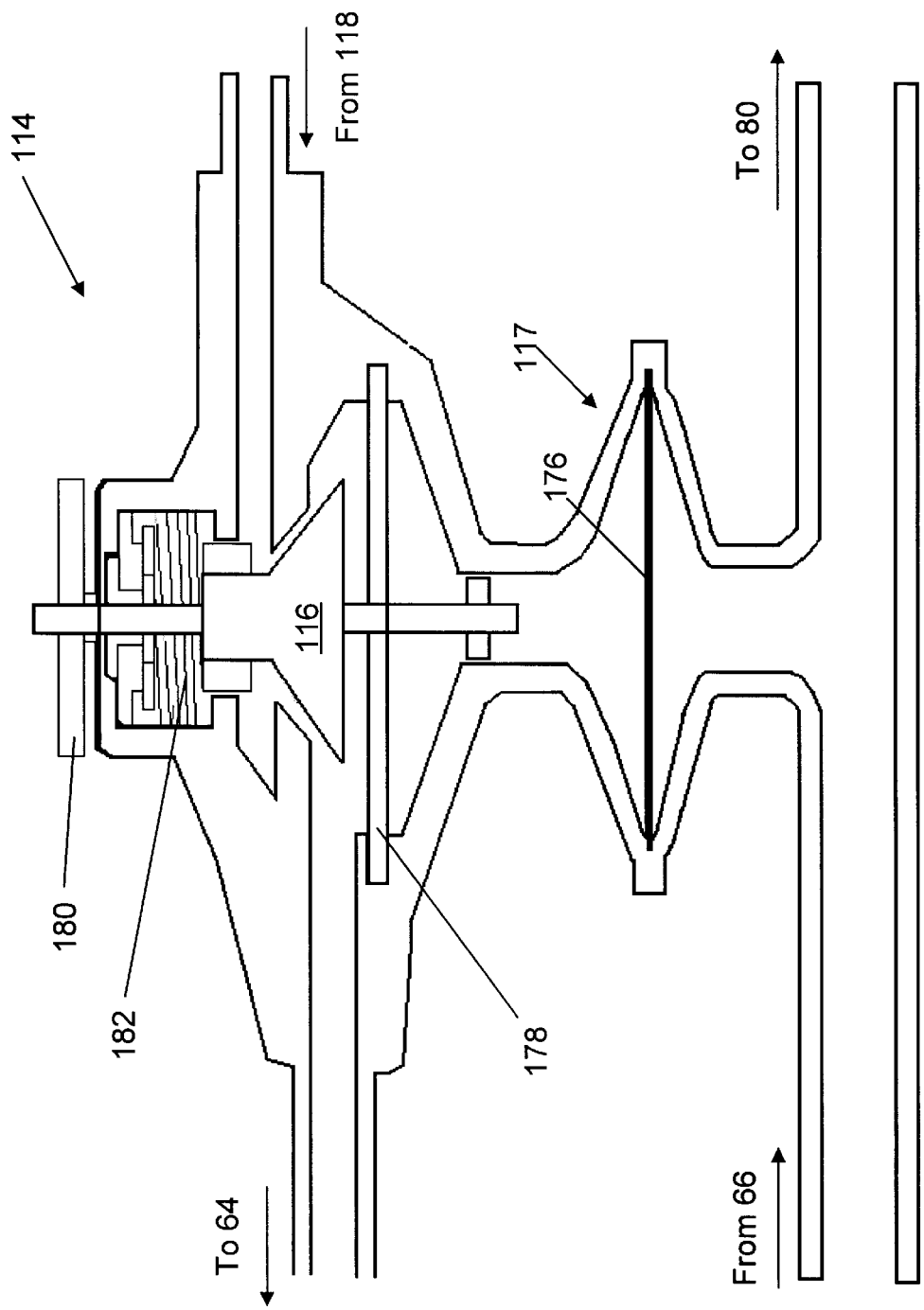
FIG. 6 is a side cut away detail view of the gravity compensator and isolator shown in FIG. 1.

FIG. 6, as well as FIG. 1, shows a detailed view of the gravity compensator 114 and isolator 117. Isolator 117 is connected to the pipe, which connects the secondary chamber 66 of the turbo charger 62 to the water separator 80 and includes a diaphragm, which shall be called the primary diaphragm 176. The gravity compensator 114 receives air flow input from air passage 118 and provides input to the primary chamber 64 of the turbo charger 62. The gravity compensator 114 includes a valve 116, a secondary diaphragm 178, an adjuster 180 and a spring 182. Pressure increases in the flow in the pipe leading to the isolator 117 cause inward movement (in an upward direction in the figure) of the primary diaphragm 176. This causes a corresponding upward movement in the secondary diaphragm 178 to which valve 116 is attached. Upward movement of the valve 116 acts to restrict air flow through the gravity compensator 114. Thus an increase in pressure from the secondary chamber 66 of the turbo charger 62 results in a decrease in pressure to the primary chamber 64, and an eventual decrease in pressure at the secondary chamber 66 output, thus regulating the pressure in the circuit. An adjuster 180 can be manipulated to vary compression of the spring 182, and thus vary the resistance that valve 116 presents to movement of the secondary diaphragm 178. The overall pressure in the circuit can therefore be controlled to sweep water condensation from the pipes, and thus compensate for low gravity conditions.

Figure 7:
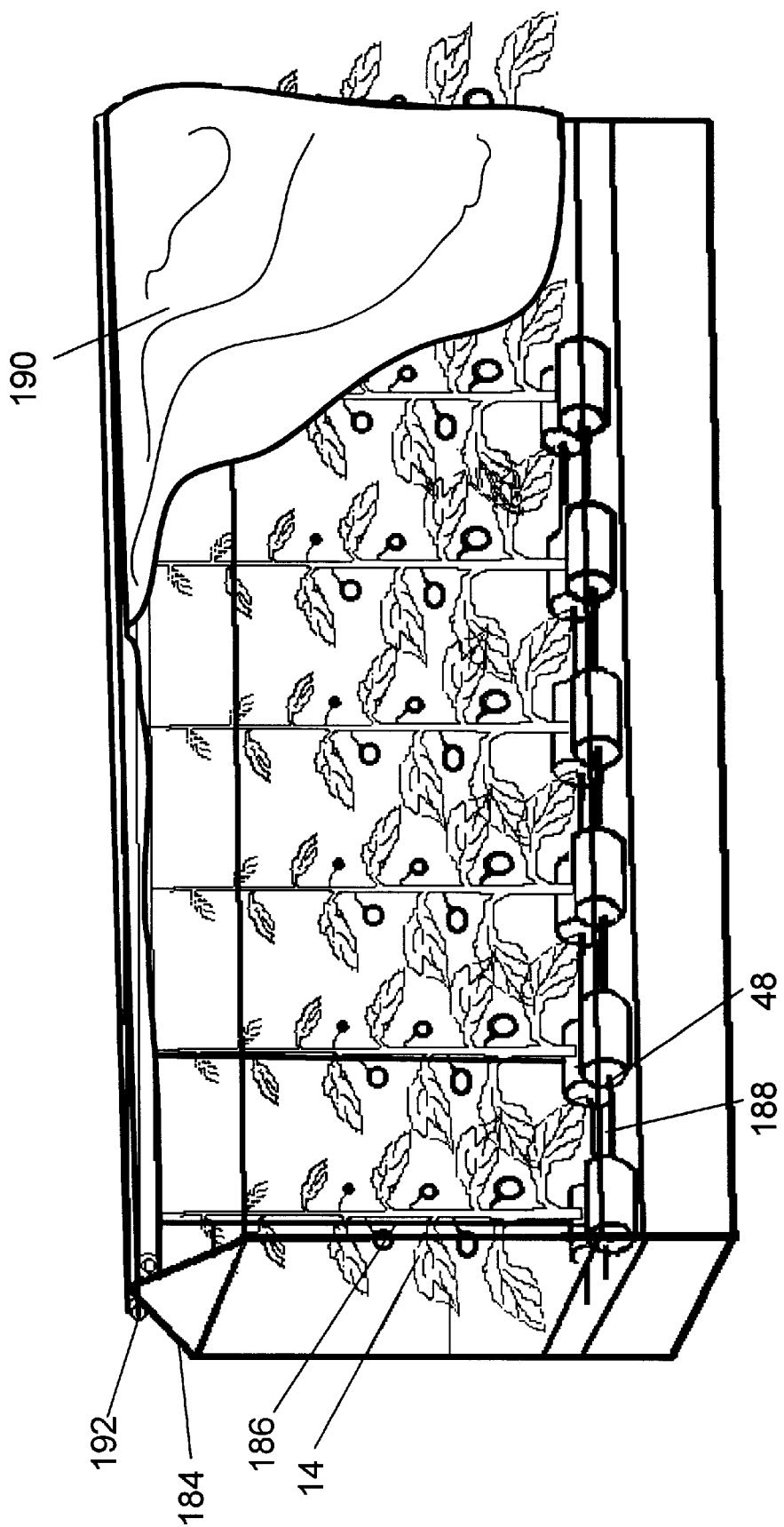
FIG. 7 is an isometric view of the upper portion of a large scale enclosure version of the present invention; and, FIG. 8 is a side detail view of the lower portion of the collective structure shown in FIG. 5.

As mentioned above, the plant growing and harvesting system 10 can be used for large groups of plants 14 rather than a few which have been placed in modules. FIG. 7 shows the upper portion of a version of the preferred embodiment which has a number of plants 14 in a large frame 184. This version has been designed for use in a terrestrial environment, and the sides may be left open to the atmosphere. Since natural lighting may be used, support cables 186 can be made from steel rather than from optically transmissive plastic. A plurality of pinch rollers 48 have been provided which are activated by a common drive shaft 188 connected to a motor (not shown). In order to retain heat within the frame 184, roll down curtains 190 have been provided, which can be rolled up on a pair of shafts 192 during warm weather and unrolled to cover the sides and top at night or when weather is cold. The curtains 190 may be made of transparent plastic material to allow sunshine to penetrate if utilized during the day. The roll-up process may be done by a motor (not shown) and may be automated by using a temperature sensor and control circuitry (also not shown) to activate the motor.

Figure 8:
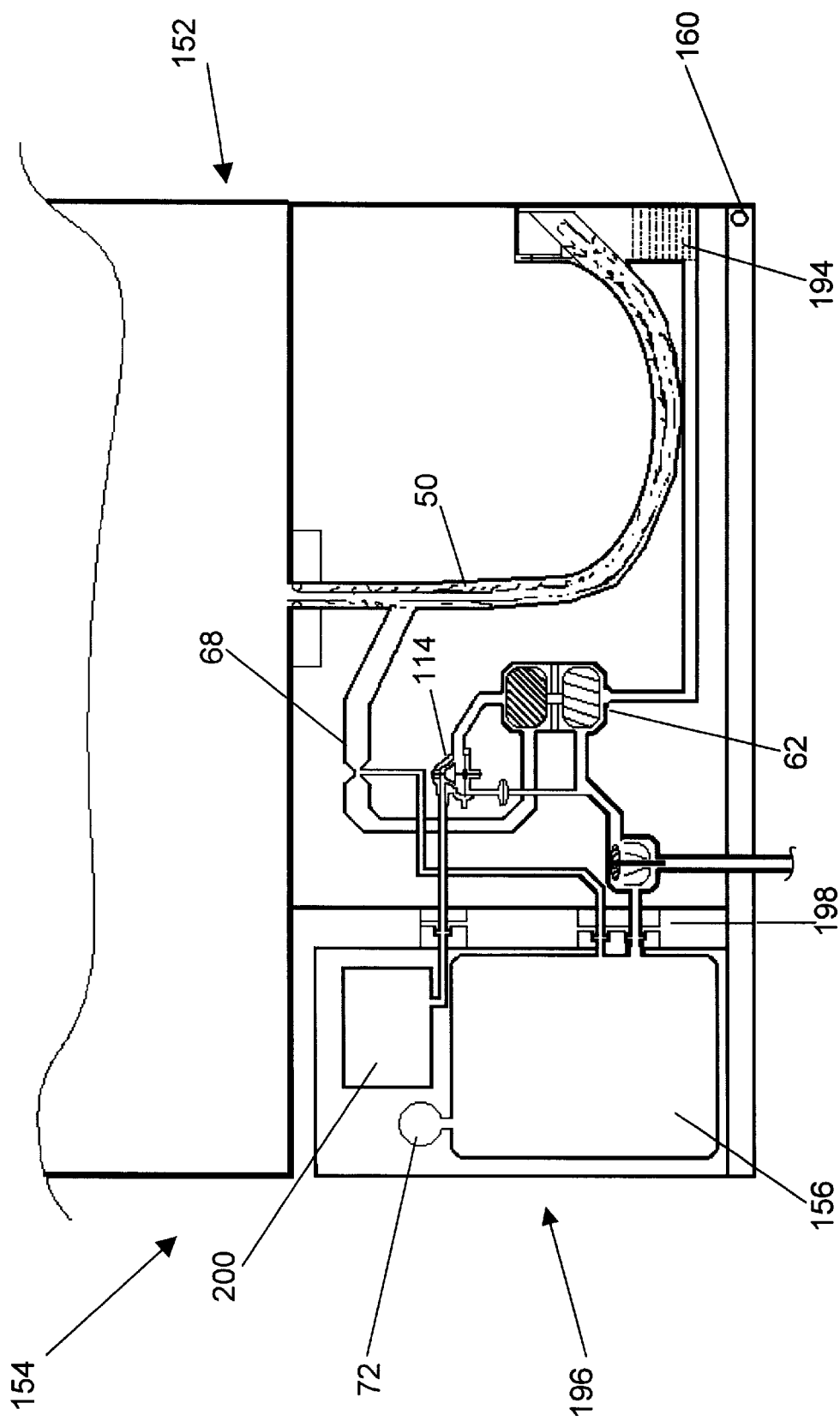

FIG. 8 shows a side view detail of the bottom portion of the collective structure 154 shown in FIG. 5. A plant growing module 152 rotates about pivot 160 as discussed above. The plant growing module 152 includes root chamber 50, turbo charger 62, atomizer 68 and a filter 194. The shared support unit 196 includes water tank 156, and an interface plate 198 which aids in the connection of air and water lines to the individual modules 152. An air compressor 200 is also shown.

In addition to the above mentioned examples, various other modifications and alterations of the inventive plant growing system 10 may be made without departing from the invention.

Industrial Applicability

The present automated plant growth system 10 is well suited for application in future long-range space missions. Examples of such missions include space stations, or self-contained colonies. However, the present invention 10 is also well suited to use in deserts, underwater habitats and tundras or anywhere in which natural environmental conditions may be inhospitable. Additionally, it may be used in otherwise hospitable environments in which cost reduction, isolation from disease, minimization of pollution and reduction of resource use are desirable.

The production of food is one of the most important industrial applications of technology. As human populations explode, more and more food is needed each year, and less and less space is available for agricultural uses. Thus, the efficient use of land for agriculture becomes more and more important with each passing day. Also, as population pressures increase, more thought is directed toward colonization of space and other planets. What is known of conditions on other planets and in space indicates that natural conditions would be extremely hostile to growth of conventional plants, which require conditions of temperature, atmosphere and nutrients which are within certain controlled limits. The present invention 10 provides such a controlled environment, which can be used either on Earth or in conditions of little or no gravity to produce crops for human consumption. Additionally the present invention 10 can produce oxygen for use in a self-contained environment containing humans and/or animals.

The present invention 10 is an automated plant growing and harvesting system. A plant 14 having foliage 52, fruit 54, a stem 56 and a root section 58 is situated in the growing space 40 so that the stem 56 is captured between the pinch rollers 48 of the support assembly 42, and the root section 58 is enclosed within the root chamber 50. The foliage 52 are illuminated by the grow lights 28 which encourages growth of the plant 14. Water and nutrients are supplied to the roots 58 by means of a spray directed from a spray tube 74. A master control 100 controls light 28 and spray 74 on and off times, the retractor assembly 46 motor, and material supply system 60 as well as fan speed 26 and other automated functions.

When the master control 100 has been informed by the sensors 98 that the plant 14 has reached the optimum height, the control sends a signal to the retractor assembly 46 which causes the pinch rollers 48 to rotate so that the plant 14 is slowly pulled downwards into the root chamber 50 at the same rate at which the plant 14 grows upwards. A branch trimming assembly 102 is positioned around the stem 56 within the harvesting basin 44 and above the support assembly 42. As the stem 56 is pulled downwards, the foliage 52 with their fruit 54 are pulled onto the blade 102, which trims them from the stem 56 and into the harvesting basin 44. The harvested fruit 104 travels through a harvesting tube 106 that is connected to the harvesting basin 44, and the fruit can be removed from a door 108. In zero or very low gravity environments, forced air from the variable speed fan 26 can be used to urge the fruit 104 down the harvesting tube 106 by forcing air into the air channels 32.

The growing space 40 connects with a water vapor collector 92 which is also connected to a second water separator 94 from which $O_2$ is released through vents 96. The output of the separator can be connected to the main water tank 70, or can provide a source of potable water. This is especially advantageous because gray water, which may contain elements of human waste, can be applied to the roots 58 of the plants 14 to provide nutrients through the material supply assembly 60. The foliage 52 of the plant 14 casts off water vapor through transpiration. This water vapor is contained in a separate potable water system 91 including the water vapor collector 92, which has no contact with the contaminants in the gray water. Thus the growing system 10 acts as a kind of organic filter to provide potable drinking water output from gray water input. This has many advantages in terms of energy conservation and component reduction, which may be crucial for space station applications, lunar colonies or underwater installations.

The plants 14 can be grown in larger enclosures 154 which each contain a number of plants 14, or in smaller modules 152, in which the plants 14 are grown separately, or in small groups. Varieties of plants 14 differ in their requirements concerning cycles of light and darkness in order to produce optimally. By using smaller modules, the differing nature of the plant varieties can be more easily accommodated in the scheduling of light usage. Also, in an enclosed environment, like a space station, the relative amounts of oxygen produced by plants 14 and carbon dioxide produced by humans must be kept in good balance. Both humans and plants 14 tend to produce less of these gases when they are in their respective sleep cycles. By having the plants 14 in smaller modules 152, and scheduling appropriate sleep cycles, the overall oxygen-carbon dioxide balance can be more flexibly maintained. Sleep cycles for the individual plants 14 can be staggered as required.

For terrestrial use, the present invention 10 addresses many deficiencies found in conventional agriculture. By providing an enclosed and highly controlled environment in which plants 14 can be isolated from disease and insect pests, little or no chemical treatments are required. The water used can be largely recycled, is administered in precise quantities for optimum growth, and is isolated from the local water table, if any. Light and dark cycles can be scheduled for maximum growth and produce output. For example, lettuce can be illuminated for 24 hours a day to produce maximal results. Tomatoes can produce fruit in as little as 30–45 days, and may continue to bear fruit all year perpetually without reduction in productivity until the crop is terminated. Additionally, since the process is largely automated, there is a great reduction in required labor and its associated costs.

For the above, and other, reasons, it is expected that the automated plant growth system 10 of the present invention will have widespread industrial applicability. Therefore, it is expected that the commercial utility of the present invention will be extensive and long lasting.

What is claimed is:

1. An automatic plant growing and harvesting system which can be used in either zero gravity or full Earth gravity conditions for controlled growth of plants, said plants each generally having a stem, foliage and a root portion, said system comprising:
    a first enclosure, said first enclosure being adapted to allow at least one plant to grow therewithin;
    an illumination system for providing and delivering photosynthetic usable energy to the plants;
    a material supply system within a second enclosure for selectively providing nutrients and delivering growth fluids to the plants within said first enclosure, said material supply system including a nutrient supply and a water supply, said material supply system being fully enclosed within said second enclosure;
    a root chamber for containing the root portions of said plants;
    a retractor assembly for controllably retracting a lower portion of said plant stems into said root chamber;
    a harvesting assembly for removing and delivering produce from said plants as said produce matures; and
    a controller which directs the actions of said illumination system, said material supply system, said retractor assembly and said harvesting assembly.

2. An automatic plant growing and harvesting system as in claim 1, wherein:
    said root chamber includes a root trimmer assembly which selectively removes the oldest portion of said root portions when roots achieve a predetermined length.

3. An automatic plant growing and harvesting system as in claim 2, wherein:
    said root chamber further includes a desiccation chamber which dries the trimmed root portions after removal.

4. An automatic plant growing and harvesting system as in claim 1, wherein:
    said harvesting assembly includes a cutting blade subassembly.

5. An automatic plant growing and harvesting system as in claim 4, wherein:
    said cutting blade subassembly includes a means for swiftly detaching branches from plant stems.

6. An automatic plant growing and harvesting system as in claim 5, wherein:
    said means for swiftly detaching branches from plant stems includes a solenoid, a spring, a swing arm and a micro-switch, said spring acting to bias said swing arm away from contact with said microswitch until a branch has pushed said swing arm to contact said microswitch, activating said solenoid to swiftly push said cutting assembly through the branch.

7. An automatic plant growing and harvesting system as in claim 1, wherein:
    said harvesting assembly includes a basin connected to a harvesting tube, whereby branches and produce may be collected after harvesting.

8. An automatic plant growing and harvesting system as in claim 7, wherein:
    said automatic plant growing and harvesting system includes a variable speed fan, which aids in urging harvested produce into said harvesting basin and said harvesting tube, after said produce has been detached from a plant stem.

9. An automatic plant growing and harvesting system as in claim 1, wherein:
    said automatic plant growing and harvesting system includes a variable speed fan, which aids in self-pollenation.

10. An automatic plant growing and harvesting system as in claim 1, wherein:
    said automatic plant growing and harvesting system includes a shaker motor attached to a stem of said plant matter, which aids in self-pollination.

11. An automatic plant growing and harvesting system as in claim 1, wherein:
    said retractor assembly includes a pinch roller subassembly.

12. An automatic plant growing and harvesting system as in claim 11, wherein:
    at least one sensor is included to detect plant growth and inform said controller, which activates said pinch roller subassembly so that plant retraction is achieved at a same rate as plant growth.

13. An automatic plant growing and harvesting system as in claim 1, wherein:
    said automatic plant growing and harvesting system includes a gravity compensator to provide increased air pressure to sweep water condensation from stagnation points in low gravity.

14. An automatic plant growing and harvesting system as in claim 1, wherein:

said illumination system includes plastic rods which direct light into said enclosure.

15. An automatic plant growing and harvesting system as in claim 1, wherein:

said automatic plant growing and harvesting system includes a self-contained potable water system which cooperates with said material supply system to convert gray water input to potable water output by providing gray water to the root portions of plants through said material supply system and collecting and condensing transpired water vapor from the foliage of plants in the potable water system.

16. An automatic plant growing and harvesting system as in claim 1, wherein:

said first enclosure is one of a plurality of first enclosures which are configured as modules of a larger assemblage of modules.

17. An automatic plant growing and harvesting system as in claim 16, wherein:

said modules are grouped to be illuminated by a common illumination source.

18. An automatic plant growing and harvesting system as in claim 16, wherein:

said modules are configured to pivot to allow easy access to the interior of said module.

19. A method of automatically growing and harvesting plant matter, which can be used in either zero gravity or full Earth gravity conditions for controlled growth of plants, said method comprising:

(1) providing a first enclosure which is adapted to allow at least one plant to grow therewithin, an illumination system for providing and delivering photosynthetic usable energy to the plant matter, a material supply system within a second enclosure for selectively providing nutrients and delivering growth fluids to the plant matter within said first enclosure, said material supply system including a nutrient supply and a water supply, said material supply system being fully enclosed within said second enclosure, a root chamber for containing root portions of said plants, a retractor assembly for controllably retracting said plants into said root chamber, a harvesting assembly for removing and delivering produce from said plants as the produce matures and a controller which directs the actions of said illumination subsystem, said material supply system, said retractor assembly and said harvesting assembly;

(2) positioning a plant which has a root portion, foliage and a stem, so that the root portion is directed into said root chamber, the foliage is contained within said enclosure, and the stem is gripped by said retractor assembly;

(3) illuminating said plant foliage with light from said illumination system;

(4) providing nutrients and growth fluids to said root portion by using said material supply system;

(5) controlling the actions of said illumination system, said material supply system, said retractor assembly and said harvesting assembly automatically by using said controller to obtain maximal growth of said plant; and (6) harvesting produce from said plant automatically as produce matures by using said harvesting assembly, as directed by said controller.

20. A method of automatically growing and harvesting plant matter, as in claim 19, in which step (5) further comprises the steps of:

(a) providing sensors which report plant growth to said controller; and (b) retracting the lower portion of the plant stem into said root chamber at a same rate as said plant grows and is detected by said sensors.

21. A method of automatically growing and harvesting plant matter, as in claim 19, in which step (6) further comprises the steps of:

(a) providing said harvesting assembly with a basin, a harvesting tube and a variable speed fan; and (b) activating said variable speed fan to urge harvested produce into said basin and said harvesting tube, so that produce may be easily collected.

22. A method of automatically growing and harvesting plant matter, as in claim 19, in which step (1) further comprises the steps of:

(a) providing said automatic plant growing and harvesting system with a gravity compensator; and (b) activating said gravity compensator to increase air pressure to sweep water condensation from stagnation points in low gravity.

23. A method of automatically growing and harvesting plant matter, as in claim 19, in which step (1) further comprises the steps of:

(a) providing a potable water supply system;

(b) providing potable water by providing gray water to the root portions of plants through said material supply system and collecting and condensing transpired water vapor from the foliage of plants in the potable water system.

* * * * *